United States Patent
Hayashi

(10) Patent No.: US 8,825,402 B2
(45) Date of Patent: Sep. 2, 2014

(54) ROUTE DISPLAY DEVICE, ROUTE DISPLAY METHOD, ROUTE DISPLAY PROGRAM, AND ROUTE DISPLAY SYSTEM

(75) Inventor: Takashi Hayashi, Okazaki (JP)

(73) Assignee: Aisin AW Co., Ltd., Aichi-ken (JP)

(*) Notice: Subject to any disclaimer, the term of this patent is extended or adjusted under 35 U.S.C. 154(b) by 180 days.

(21) Appl. No.: 13/071,109

(22) Filed: Mar. 24, 2011

(65) Prior Publication Data
US 2011/0246061 A1 Oct. 6, 2011

(30) Foreign Application Priority Data

Mar. 31, 2010 (JP) ................................. 2010-084698
Jan. 25, 2011 (JP) ................................. 2011-013165

(51) Int. Cl.
*G01C 21/34* (2006.01)
(52) U.S. Cl.
USPC .......................................................... 701/533
(58) Field of Classification Search
None
See application file for complete search history.

(56) References Cited

U.S. PATENT DOCUMENTS

| | | | | |
|---|---|---|---|---|
| 5,220,507 A * | 6/1993 | Kirson | ........................... | 701/533 |
| 5,790,976 A * | 8/1998 | Boll et al. | .................. | 455/456.5 |
| 5,892,346 A | 4/1999 | Moroto et al. | | |
| 6,864,807 B2 | 3/2005 | Todoriki et al. | | |
| 7,853,403 B2 | 12/2010 | Tanaka | | |
| 2003/0006914 A1* | 1/2003 | Todoriki et al. | ............... | 340/995 |
| 2008/0168369 A1* | 7/2008 | Tadman et al. | ............... | 715/764 |
| 2008/0208462 A1* | 8/2008 | Tanaka | ......................... | 701/209 |

FOREIGN PATENT DOCUMENTS

| | | |
|---|---|---|
| JP | 10-170293 A | 6/1998 |
| JP | 2000-337910 A | 12/2000 |
| JP | 2001-066148 A | 3/2001 |
| JP | 2003-21522 A | 1/2003 |
| JP | 2003-294463 A | 10/2003 |
| JP | 2006-112932 A | 4/2006 |
| JP | 2006-115623 A | 4/2006 |
| JP | 2007-155404 A | 6/2007 |
| JP | 2008-209208 A | 9/2008 |
| JP | 2008-309544 A | 12/2008 |
| JP | 2009-137456 A | 6/2009 |

OTHER PUBLICATIONS

Extended European Search Report, dated Dec. 9, 2013, issued in counterpart European Patent Application No. 11158667.3.
Japanese Office Action, dated Feb. 12, 2014, issued in counterpart Japanese Patent Application No. 2011-013165.

* cited by examiner

*Primary Examiner* — Thomas Tarcza
*Assistant Examiner* — Garrett Evans
(74) *Attorney, Agent, or Firm* — Sughrue Mion, PLLC

(57) ABSTRACT

A route display apparatus and method are provided. The apparatus includes a search unit that searches for a plurality of routes in which a plurality of destinations are stopped by in a different stopping order combination in each route. The apparatus also includes a prediction unit that predicts, for each of the routes, a travelable position that can be reached with a remaining amount of a battery. The prediction unit is configured to predict, for each of the routes, a necessity of charging based on whether the travelable position is on a side of a departure point in relation to a final destination. The apparatus also includes a display control unit that displays, for each of the routes, the necessity of charging in association with a corresponding stopping order for each of the routes, on a display part.

11 Claims, 7 Drawing Sheets

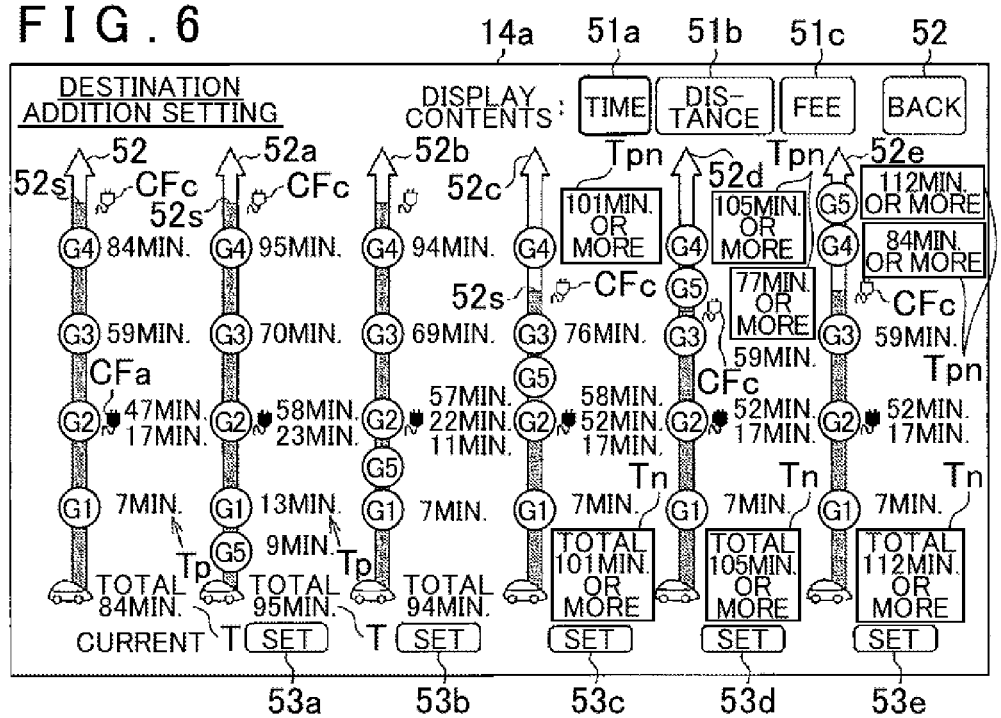
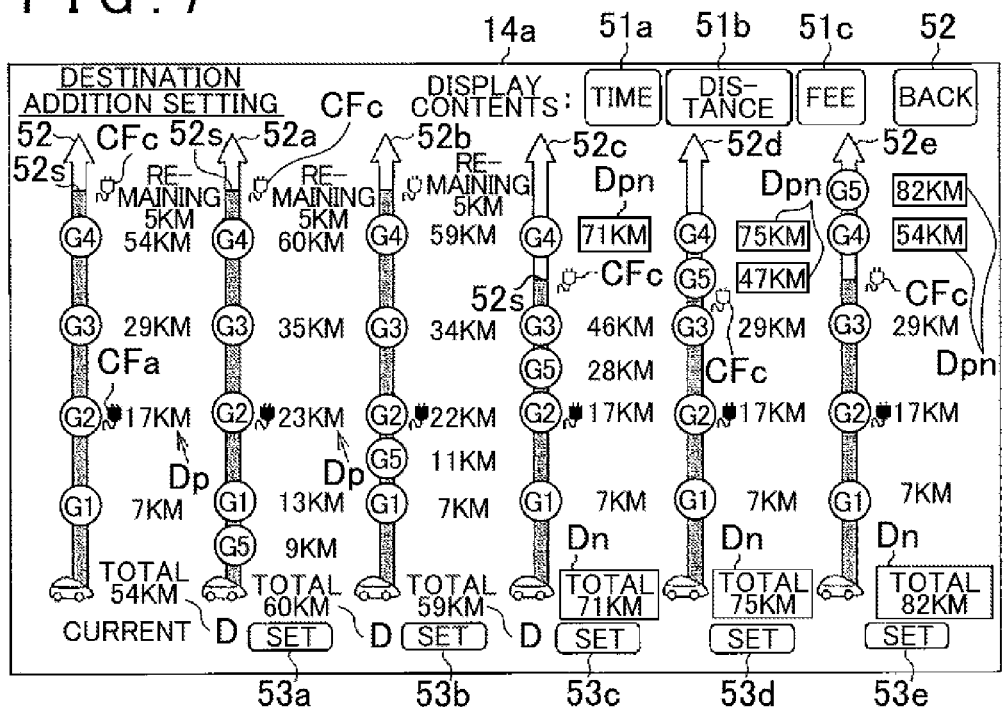

ROUTE DISPLAY DEVICE, ROUTE DISPLAY METHOD, ROUTE DISPLAY PROGRAM, AND ROUTE DISPLAY SYSTEM

INCORPORATION BY REFERENCE

This application claims priority from Japanese Patent Application No. 2010-084698 filed on Mar. 31, 2010 and Japanese Application No. 2011-013165 filed on Jan. 25, 2011, including the specification, drawings and abstract thereof, the disclosures of which are incorporated herein by reference in their entirety.

BACKGROUND OF THE INVENTION

1. Field of the Invention

Aspects of the present invention relate to a route display device that displays a route of a vehicle, more particularly, a route display device, a route display method, a route display program, and a route display system that display a route for stopping by a plurality of destinations.

2. Description of the Related Art

In a navigation device that displays a route of a vehicle, as described in Japanese Patent Application; Publication No. JP-A-2001-66148, for example, in order that a route meeting a user's intention is searched, a stopping order in which a length of the route is the shortest or a stopping order in which a required time is the shortest may be selected before the route search. In addition, a technology in which a plurality of destinations are selected on an axis of a scroll bar and a route is searched such that the stopping order of the plurality of destinations accords with the order on the axis of the scroll bar, as described in Japanese Patent Application; Publication No. JP-A-2007-155404, is also known as a technology that provides information on the route meeting the user's intention.

SUMMARY OF THE INVENTION

Recently, electric vehicles using an externally charged battery as a drive electric source for a motor, such as plug-in hybrid vehicles, battery vehicles, and the like, have received a lot of attention as environmentally-friendly vehicles. On the other hand, the users need to pay special attention to whether charging of the battery is necessary when they use the above-mentioned electric vehicles in a social infrastructure, which is structured on the basis of vehicles having an internal combustion engine as a power generation source.

On the other hand, when a destination or the stopping order is changed as mentioned above, a length of a guidance route often changes. If the guidance route becomes long due to the change of the stopping order or the like, a final destination may not be reached by EV drive using the motor as a power source. In addition, if a charging facility is included in one of the plurality of destinations, a distance between a departure point and the charging facility may change. In such a case, even if the final destination can be reached, a charging time at the charging facility, especially a travel time for arriving at the final destination can largely change.

As a result, as long as the vehicle to be used is an electric vehicle, if the destinations and/or the stopping order are changed as described in the above-mentioned Japanese Patent Application; Publication No. JP-A-2001-66148 and Japanese Patent Application; Publication No. JP-A-2007-155404, it is difficult to realize a drive meeting the user's intention.

In light of the problem described above, it is an aspect of the present invention to provide a route display device, a route display method, a route display program, and a route display system that are capable of providing information on routes meeting the intention of the user that utilizes the electric vehicle.

MEANS FOR SOLVING THE PROBLEMS

Hereinafter, methods to solve the above-mentioned problem and their effects are described.

The invention described in a first aspect of the present invention is characterized in that a route display device that displays a route of a vehicle includes: a search unit that searches for a plurality of routes in which a plurality of destinations are stopped by in a different stopping orders combination for each route; a prediction unit that predicts, for each of the routes, a travelable position which can be reached with a remaining amount of a battery and predicts, for each of the routes, a necessity of charging based on whether the travelable position is on a side of a departure point in relation to a final destination; and a display control unit that displays, for each of the routes, the necessity of charging in association with a corresponding stopping order for each of the routes, on a display part.

According to the invention described in the first aspect of the present invention, the necessity of charging is associated with the stopping order for each of the plurality of routes having different stopping order combinations of the destinations, and displayed. Therefore, it is possible to make the user recognize the necessity of charging, that is, whether all the destinations can be reached with a limited remaining amount of the battery for each of the plurality of routes having different stopping orders of the destinations. In addition, for the route in which the charging is required, it is possible to encourage the user in setting the destinations to take a measure such as newly-adding a charging facility as a destination, moving a charging facility that is already set as a destination closer to the final destination, and selecting a stopping order in which the charging is not required. Thereby, it is possible to provide information on routes meeting the intention of the user that utilizes an electric vehicle.

The invention described in a second aspect of the present invention is characterized in that among the plurality of routes, for a route in which a charging facility is included in the destination within a travel area which can be reached with the remaining amount, the prediction unit: predicts that the remaining amount at the charging facility will be a designated charging amount that is the remaining amount after charging at the charging facility, and the travelable position on the route which can be reached from the charging facility with the designated charging amount; and further predicts the necessity of charging based on whether the travelable position is on the side of the departure point in relation to the final destination.

If a charging facility is set as a destination, the battery is normally charged up to the designated charging amount at the charging facility. If an increase of the remaining amount by the charging is not reflected into the above-mentioned necessity of charging although the charging is performed at the charging facility, the accuracy of the information regarding the necessity of charging is lowered.

In this regard, according to the invention described in the second aspect of the present invention, if a charging facility is set as a destination within the travel area, it is predicted that the remaining amount at the charging facility will be the designated charging amount. For the route in a travel direction from the charging facility, the necessity of charging is predicted based on the travelable position which can be reached with the designated charging amount. Therefore, if a charging facility is included in the plurality of destinations, it is possible to increase the accuracy of the information regarding the necessity of charging.

The invention described in a third aspect of the present invention is characterized in that the display control unit arranges and displays the plurality of destinations and the travelable position in a travel order for each of the routes.

If a plurality of destinations are set, there normally are a destination with relatively high priority and a destination with relatively low priority in the plurality of destinations. Also for the stopping order combinations in which the plurality of destinations are stopped by, there is a stopping order with relatively high priority and a stopping order with relatively low priority. Therefore, the user possibly select as a guidance route a searched route, in which all the destinations cannot be reached with the limited remaining amount of the battery as long as the destination with relatively high priority can be reached. That is, as criteria of the user in selecting a route from a plurality of routes, there is a case in which the user prioritizes the destination(s) that can be reached with the limited amount of the battery.

In this regard, according to the invention described in the third aspect of the present invention, the plurality of destinations and the travelable position are allocated in a travel order (a stopping order) and displayed for each of the routes; therefore, it is possible to make the user recognize at which point on the route stopping by the plurality of the destinations the charging becomes necessary, that is, which is the farthest destination the vehicle can reach with the limited remaining amount of the battery. In addition, the above-mentioned information is displayed for each of the routes; therefore, it is possible to make the user roughly recognize which destination(s) can be reached in which stopping order. Therefore, for the route in which the charging is required, it is possible to properly encourage the user to take a measure such as newly-adding a charging facility as a destination, or moving a charging facility that is already set as a destination closer to the final destination. In addition, for the route in which the charging is required, it is possible to make the user recognize the reachable destination(s). Therefore, it is possible to make the user select a guidance route from even the route(s) in which all the destinations cannot be reached with the limited remaining amount of the battery. Consequently, it is possible to provide information on routes meeting the user's intention based on the reachable destination(s).

The invention described in a fourth aspect of the present invention is characterized in that the prediction unit: for each of the plurality of routes, calculates a travel time for traveling the route as a required time of the route; and among the plurality of routes, for a route in which a charging facility is included in the destination within a travel area which can be reached with the remaining amount, calculates the required time of the route by adding a charging time at the charging facility to the travel time of the route, and the display control unit displays the required time for each of the routes.

The criteria of the user in selecting a route from the plurality of routes include the required time to travel the route. On the other hand, the charging time required to charge the battery is normally quite long compared to a fuel supply to a fuel tank, and naturally, the rate of the charging time to the above-mentioned required time is large. In addition, if the remaining amount at the charging facility changes, that is, if the length of the route to the charging facility changes, the charging time largely changes.

In this regard, according to the invention described in the fourth aspect of the present invention, if a charging facility is set as a destination within the travel area, the charging time at the charging facility is included in the required time to travel the route. Therefore, if the charging facility is included in the plurality of destinations, the required time including the charging time at the charging facility is informed to the user. Consequently, it is possible to provide information on routes meeting the user's intention based on the required time.

The invention described in a fifth aspect of the present invention is characterized in that the prediction unit: for each of the plurality of routes, calculates a road fee required to travel the route as a travel fee of the route; and among the plurality of routes, for a route in which a charging facility is included in the destination within a travel area which can be reached with the remaining amount, calculates the travel fee of the route by adding a charging fee at the charging facility to the road fee of the route, and the display control unit displays the travel fee for each of the routes.

The criteria of the user in selecting a route from the plurality of routes include the travel fee required to travel the route. On the other hand, if the charging is performed within the travel area, the rate of the charging fee to the travel fee is too large to ignore. In addition, if the remaining amount at the charging facility changes, that is, if the length of the route to the charging facility changes, the travel fee also changes.

In this regard, according to the invention described in the fifth aspect of the present invention, if a charging facility is set as a destination within the travel area, the charging fee at the charging facility is included in the travel fee required to travel the route. Therefore, if the charging facility is included in the plurality of destinations, the travel fee to which the charging fee at the charging facility is reflected is informed to the user. Consequently, it is possible to provide information on routes meeting the user's intention based on the travel fee.

The invention described in a sixth aspect of the present invention is characterized in that, if a new destination is added to a previously-set route, the search unit searches for a route stopping by the new destination on the side of the departure point in relation to a destination included in the previously-set route and a route stopping by the new destination on the side of the final destination in relation to the destination included in the previously-set route.

In a route that stops by the plurality of destinations, a visit purpose of one destination is often closely related to a visit purpose of another destination. The relative stopping order of the destinations including such relation is preferably maintained to search for a route meeting the user's intention.

In this regard, according to the invention described in the sixth aspect of the present invention, if a new destination is added to a previously-set route, routes are searched such that the new destination is stopped by on the side of the departure point and on the side of the final destination in relation to a destination included in the previously-set route. Therefore, a plurality of routes is searched in such manner that the relative stopping order of the destinations in the previously-set route is maintained. Consequently, in a case where the destinations are closely related each other as above, it is possible to provide information on routes meeting the user's intention.

The invention described in a seventh aspect of the present invention is characterized in that a route display method for displaying a route of a vehicle includes the steps of: searching for a plurality of routes in which a plurality of destinations are stopped by in a different stopping order combination for each route; predicting, for each of the routes, a travelable position which can be reached with a remaining amount of a battery and predicting, for each of the routes, a necessity of charging based on whether the travelable position is on a side of a departure point in relation to a final destination; and displaying, for each of the routes, the necessity of charging in association with a corresponding stopping order for each of the routes.

According to the invention described in the seventh aspect of the present invention, the necessity of charging is associated with the stopping order for each of the plurality of routes having different stopping order combinations of the destinations, and displayed. Therefore, it is possible to make the user recognize the necessity of charging, that is, whether all the destinations can be reached with a limited remaining amount of the battery for each of the plurality of routes having different stopping order combinations of the destinations. In addition, for the route in which the charging is required, it is possible to encourage the user in setting the destinations to take a measure such as newly-adding a charging facility as a destination, moving a charging facility that is already set as a destination closer to the final destination, and selecting a stopping order in which the charging is not required. Therefore, it is possible to provide information on routes meeting the intention of the user that utilizes an electric vehicle.

The invention described in an eighth aspect of the present invention is characterized in that a route display program using a control unit that controls a route display of a vehicle is characterized in that the control unit functions as: a search unit that searches for a plurality of routes in which a plurality of destinations are stopped by in a different stopping orders combination for each route; a prediction unit that predicts, for each of the routes, a travelable position which can be reached with a remaining amount of a battery and predicts, for each of the routes, a necessity of charging based on whether the travelable position is on a side of a departure point in relation to a final destination; and a display control unit that displays, for each of the routes, the necessity of charging in association with a corresponding stopping order for each of the routes, on a display part.

According to the invention described in the eighth aspect of the present invention, the necessity of charging is associated with the stopping order for each of the plurality of routes having different stopping orders of the destinations, and displayed. Therefore, it is possible to make the user recognize the necessity of charging, that is, whether all the destinations can be reached with a limited remaining amount of the battery for each of the plurality of routes having different stopping orders of the destinations. In addition, for the route in which the charging is required, it is possible to encourage the user in setting the destinations to take a measure such as newly-adding a charging facility as a destination, moving a charging facility that is already set as a destination closer to the final destination, and selecting a stopping order in which the charging is not required. Therefore, it is possible to provide information on routes meeting the intention of the user that utilizes an electric vehicle.

The invention described in a ninth aspect of the present invention is characterized in that a route display system including a plurality of devices capable of mutually transmitting and receiving information that displays a route of a vehicle, the route display system includes: a search unit that searches for a plurality of routes in which a plurality of destinations are stopped by in a different stopping orders combination in each route; a prediction unit that predicts, for each of the routes, a travelable position which can be reached with a remaining amount of a battery and predicts, for each of the routes, a necessity of charging based on whether the travelable position is on a side of a departure point in relation to a final destination; and a display control unit that displays, for each of the routes, the necessity of charging in association with a corresponding stopping order for each of the routes, on a display part.

According to the invention described in the ninth aspect of the present invention, by mutually transmitting and receiving information between the plurality of devices, the necessity of charging is associated with the stopping order for each of the plurality of routes having different stopping order combinations of the destinations, and displayed. Therefore, it is possible to make the user recognize the necessity of charging, that is, whether all the destinations can be reached with a limited remaining amount of the battery for each of the plurality of routes having different stopping order combinations of the destinations. In addition, for the route in which the charging is required, it is possible to encourage the user in setting the destinations to take a measure such as newly-adding a charging facility as a destination, moving a charging facility that is already set as a destination closer to the final destination, and selecting a stopping order in which the charging is not required. Thereby, it is possible to provide information on routes meeting the intention of the user that utilizes an electric vehicle.

BRIEF DESCRIPTION OF THE DRAWINGS

FIG. 6 shows an example of the destination addition setting screen displayed by the navigation device.

FIG. 7 shows an example of the destination addition setting screen displayed by the navigation device.

DETAILED DESCRIPTION OF THE NON-LIMITING EXEMPLARY EMBODIMENTS

Figure 1:
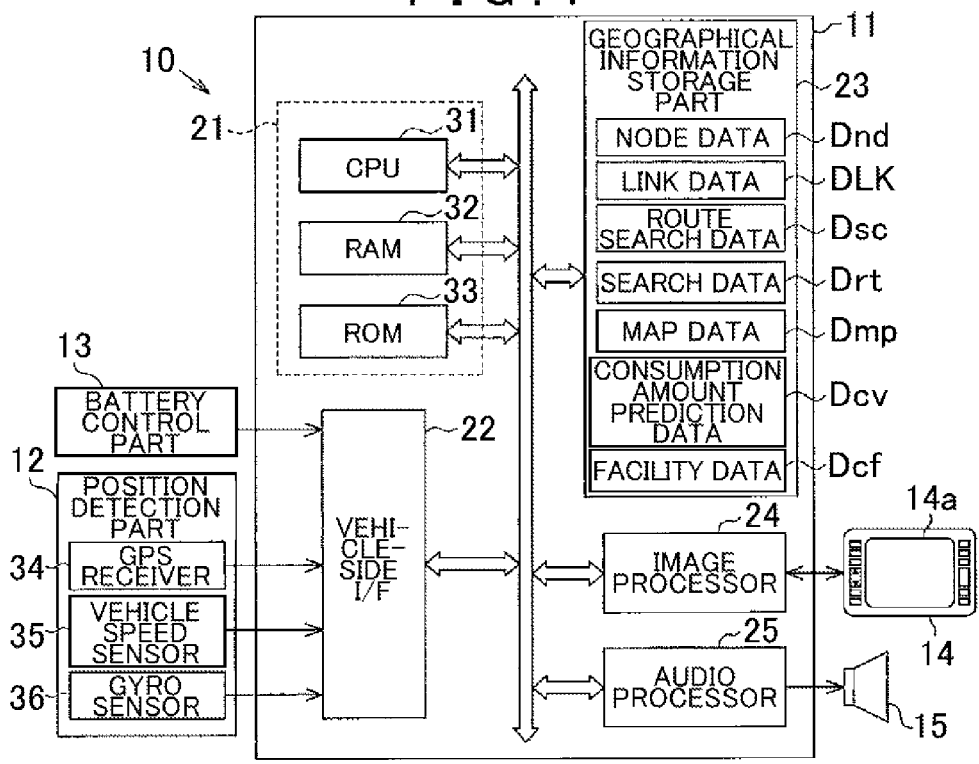
FIG. 1 is a block diagram showing a structure of a navigation device in a specific embodiment, the navigation device in which a route display device according to the present invention is implemented.

Hereinafter, a specific embodiment of a route display device, a route display method, and a route display program according to an exemplary embodiment will be explained in detail with reference to FIGS. 1 to 8. FIG. 1 is a block diagram showing a structure of a navigation device serving as the route display device according to the present embodiment.

A navigation device 10 includes a control unit, a search unit, and a prediction unit, and also includes a controller 11 that performs overall control of the navigation device 10. In addition, the navigation device 10 includes a position detection part 12, a battery control part 13, a display 14 including a display part, and a speaker 15.

The controller 11 includes a control part 21 including a display control unit, a vehicle-side I/F 22, a geographical information storage part 23, an image processor 24, and an audio processor 25. The control part 21 includes a CPU 31 for performing various kinds of calculations based on input data, a RAM 32 used as a working memory of the CPU 31 and in which route data or the like when the route has been searched is stored, and a ROM 33 which records various programs for control.

The position detection part 12 includes a GPS receiver 34, a vehicle speed sensor 35, and a gyro sensor 36. The controller 11 detects an absolute position such as a longitude and latitude by electric navigation based on signals received by the GPS receiver 34. In addition, the controller 11 calculates a relative position from a reference position by autonomous navigation based on the signals detected by the vehicle speed sensor 35 and the gyro sensor 36. Thereafter, the controller 11 specifies a current position of a vehicle by combining the absolute position and the relative position output from the position detection part 12.

The battery control part 13 controls charging and discharging electric power of a vehicular battery that is charged by connecting a charging connector with an electric power supply source such as an outlet outside the vehicle. The battery control part 13 calculates a SOC (State of Charge) indicating a remaining amount of the battery in a method of prediction from an open voltage value of the battery or an electric current accumulation method of accumulating charged electric current value of the battery. Thereafter, using the remaining amount of the battery output from the battery control part 13, the controller 11 predicts a remaining amount Er0 of the battery at the current position, a remaining amount Er of the battery on a searched route, a charging fee Cv required for charging, and a charging time Tv required for charging.

The image processor 24 creates various kinds of image data based on control signals from the control part 21 to display on a display part 14a of the display 14, and outputs the created image data to the display 14. The image processor 24 displays a plurality of searched routes from a departure point to a final destination and a destination addition setting screen for setting a guidance route from the plurality of searched routes on the display part 14a of the display 14. In addition, the image processor 24 also displays a map screen in which a vehicle index indicating a current position of the vehicle is overlapped on the map screen with an emphasized set guidance route on the display part 14a. Further, the image processor 24 displays traffic information, operation guidance, an operation menu, key guidance, guidance information along the guidance route on the display part 14a of the display 14.

The display 14 includes a plurality of operation switches such as various keys and buttons that receive operations from a user. When the respective operation switches are pressed, various kinds of instruction commands are output from the display 14 to the controller 11. For example, after the destination addition setting screen for setting a plurality of destinations and the departure point has been displayed on the display 14, if the plurality of destinations and the departure point are output from the display 14 to the controller 11, the controller 11 searches for a plurality of routes from the departure point to the final destination via the plurality of destinations. In addition, after the plurality of searched routes have been displayed on the display 14, if one searched route among the plurality of searched routes is output as the guidance route from the display 14 to the controller 11, the controller 11 starts route guidance according to the guidance route.

The audio processor 25 reads audio data from an audio data storage in the audio processor 25 to output various kinds of guidance audio from the speaker 15.

The geographical information storage part 23 is an external storage medium such as a hard disk, an optical disk, and the like. The geographical information storage part 23 stores data for displaying a map image, the traffic information, the searched route, and the guidance route, and various kinds of data used for calculation of the searched route and the guidance route. Specifically, the geographical information storage part 23 stores node data Dnd regarding nodes, link data Dlk regarding links, route search data Dsc for searching for routes to destinations, search data Drt for searching for positions, map data Dmp for displaying a map, consumption amount prediction data Dcv indicating a relation between a travel route and a consumption amount of the battery, and facility data Dcf regarding charging facilities. The various kinds of data stored in the geographical information storage part 23 are updated in receiving information distributed from an information distribution center for example.

The nodes are set at branches such as intersections, T-shaped roads, terminal points of roads, and the like. The node data Dnd includes node IDs identifying such nodes in association with positions of the nodes, attributes of the nodes, and identifiers of the respective links connected to the nodes.

The link data Dlk includes link IDs identifying links in association with the node IDs of connected nodes, road attributes such as the number of lanes, road widths, road inclination, downgrade roads, upgrade roads and the like, link lengths, road types such as national roads, highways, and the like, traffic regulation information such as one-way, road fees, and the like.

The search data Dsc includes cost data used for calculating a search cost that is a total of nodes costs, link costs and the like, travel times required to pass through links, route display data for displaying the guidance route on the map of the display 14, and the like. In a case where a subject node is set to an intersection for example, the value of the node cost is set according to the travel route such as a direct advance, a right turn, or a left turn in passing through the intersection and a presence or absence of a signal. The value of the link cost is set based on the road attribute, the road type, the road width, the number of lanes, the link length, and the like, which are included in the link data Dlk.

When information regarding a plurality of destinations and a departure point is output from the display 14 to the controller 11, the controller 11 searches for routes in which the plurality of destinations are stopped by in different stopping order combinations. In such a case, the controller 11 searches for a route for each of all stopping order combinations such that the searched cost becomes the smallest under the conditions such as travel distance priority, general road priority, toll road priority, travel time priority, fee priority, and the like. When the searched route for each of all stopping order combinations is acquired, the controller 11 calculates, for each searched route, travel information including a travel distance D from the departure point to the final destination, a required time T, a travel fee Cf, and a travelable position which can be reached with the remaining amount Er of the battery. In addition, route information is associated with the stopping order for each searched route and displayed in the destination addition setting screen. The route information includes the information indicating the travel distance D, the required time T, the travel fee Cf, and a necessity of charging. When the user selects a searched route based on the destination addition setting screen, the selected searched route is output from the display 14 to the controller 11. Then, the controller 11 sets the selected searched route as the guidance route and starts route guidance.

The map data Dmp is data for displaying the map screen on the display 14 and is hierarchized in accordance with an information amount of a road network. The map data Dmp is sectioned by meshes having an area size that varies between hierarchized layers, and configured such that a mesh ID for identifying a mesh is associated with road shape data for drawing curve sections of roads and background data for drawing areas other than the roads.

The consumption amount prediction data Dcv is data in which a length and an inclination of the route are associated with a consumption amount of the battery required to travel the route. When the controller 11 calculates the searched route for each of all stopping order combinations, the controller 11 calculates a travel area which can be reached with the remaining amount Er (for example, the remaining amount Er0) at the current position (for example, the departure point) for each route based on the length and the inclination of the searched route and the consumption amount prediction data Dcv. The controller 11 calculates a position on the route that is farthest from the current position (for example, the departure point) in the travel area as the travelable position.

The facility data Dcf includes a facility ID for identifying a facility, a position of the facility, a type of the facility, and the like. The type of the facility in the facility data Dcf includes a charging facility. The data regarding the charging facility further includes a charging speed that is a charging amount for a certain time period, a fee that is required for charging, and the like. The charging speed indicating charging capacity of the charging facility is standardized with three types of fast charging, doubled-speed charging, and normal charging. The charging speeds of these three types increase in the following order: the normal charging, the doubled-speed charging, and the fast charging. For example, when a current charged amount is 30% and a designated charged amount is 80%, the charged amount of the battery reaches the designated charged amount by 30-minute charging in case of the fast charging facility. On the other hand, 120-minute charging is necessary in case of the doubled-speed charging facility, and 360-minute charging in case of the normal charging facility. The above-mentioned charging speed is a value that changes every minute depending on the condition of the battery such as the remaining amount Er of the battery [Wh], the temperature of the battery, and the like. Therefore, in order to utilize a more accurate charging speed, it is possible to adjust a constant representing the capacity of each of the above-mentioned charging facilities with the condition of the battery.

If a charging facility is included in the destination(s) within the travel area, the remaining amount at the charging facility is assumed to be the remaining amount Er after charging at the charging facility, i.e., the designated charging amount, and the controller 11 executes various kinds of processing based on this assumption. That is, under the assumption that charging is executed at the charging facility, the controller 11 calculates, for each searched route, the travel information including the travel distance D of the searched route, the required time T for traveling the searched route, and the travel fee Cf required to travel the searched route in the following manner. The designated charging amount is, for example, a fully-charged amount, 80% of the fully-charged amount, or an arbitrary value set by the user.

Specifically, if a charging facility is included in the destination(s) within the travel area, the controller 11 calculates the distance travelable from the charging facility with a designated charging amount Ers. In addition, based on the remaining amount Er when the vehicle arrives at the charging facility, the controller 11 calculates the charging time Tv required for charging at the charging facility using the above-mentioned facility data Dcf. Thereafter, the controller 11 calculates the required time T for traveling the searched route by adding a travel time Ts of the searched route to the above-mentioned charging time Tv (Required Time T=Travel Time Ts+Charging Time Tv).

In addition, based on the remaining amount Er when the vehicle arrives at the charging facility, the controller 11 calculates the charging fee Cv required for charging at the charging facility using the above-mentioned facility data Dcf. Thereafter, the controller 11 calculates the travel fee Cf required to travel the searched route by adding a road fee Cr for the searched route to the above-mentioned charging fee Cv (Travel Fee Cf=Road Fee Cr+Charging Fee Cv).

Figure 2:
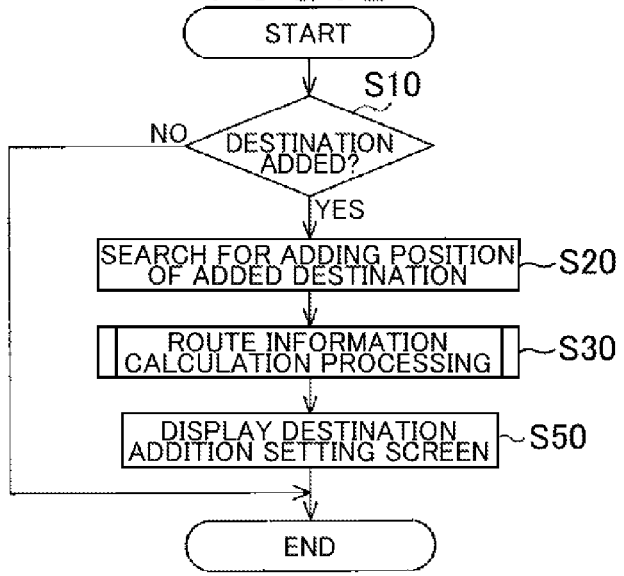
FIG. 2 is a flow chart showing a procedure of destination addition setting processing executed by the navigation device.
Figure 3A:
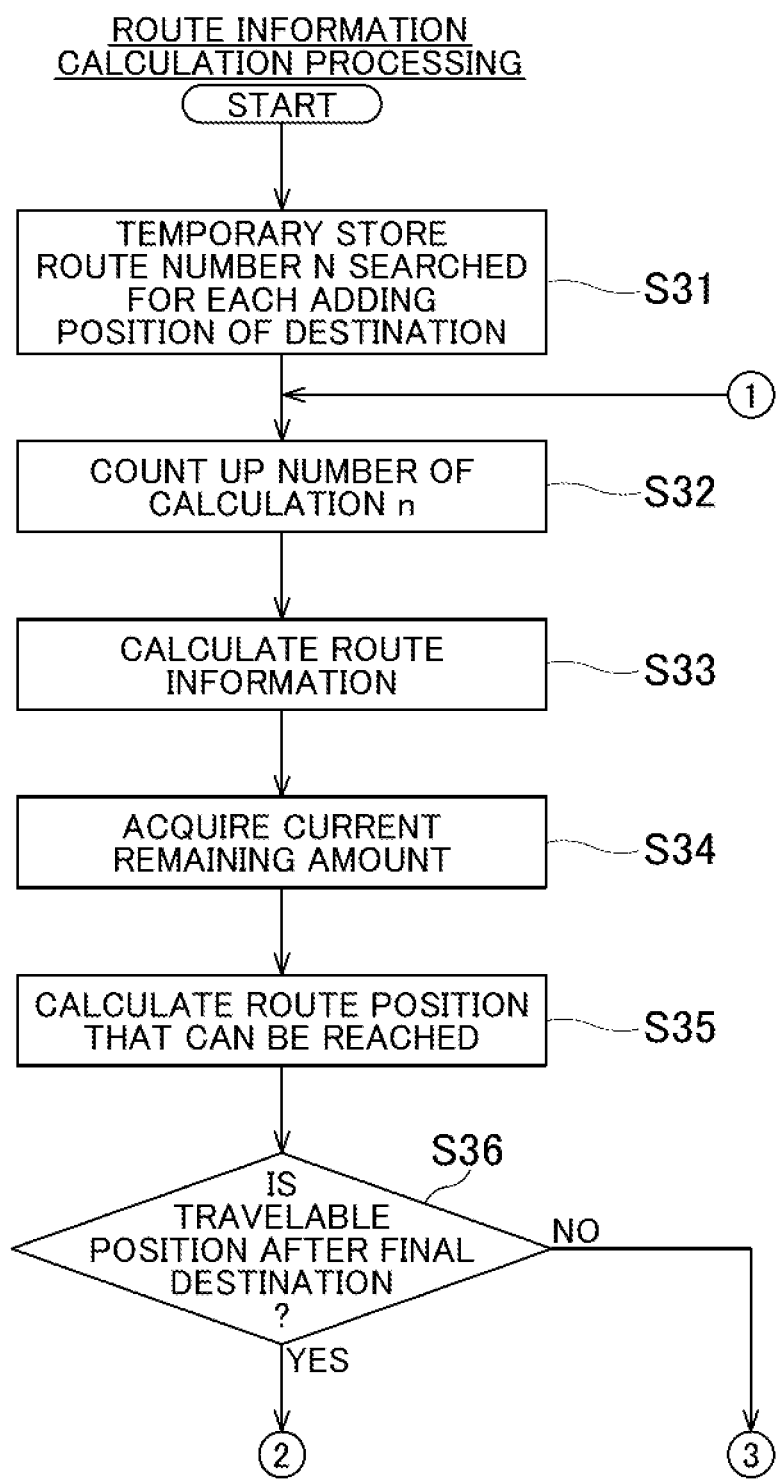
FIG. 3 is a flow chart showing a procedure of route information calculation processing in the destination addition setting processing.
Figure 3B:
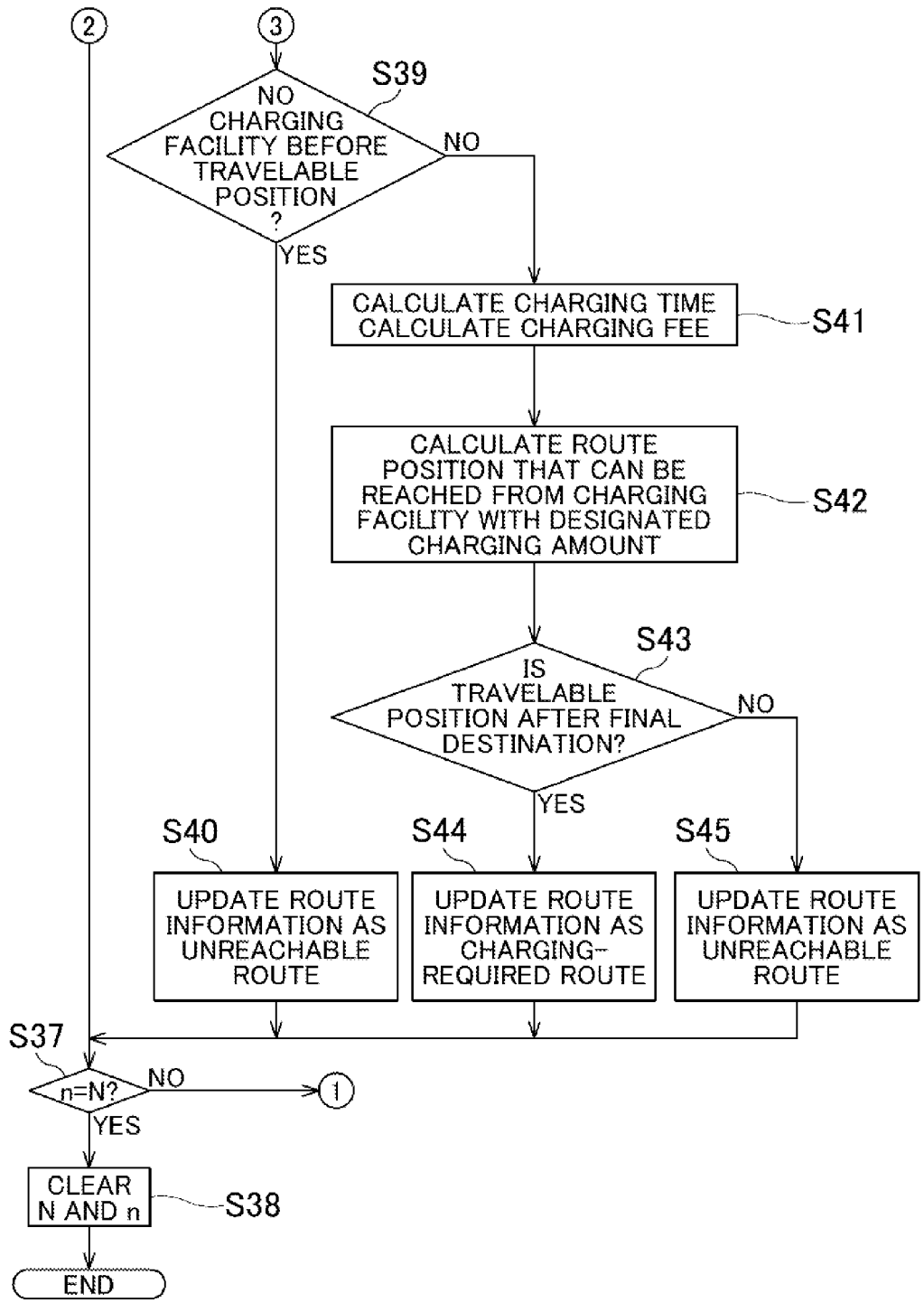
Figure 4:
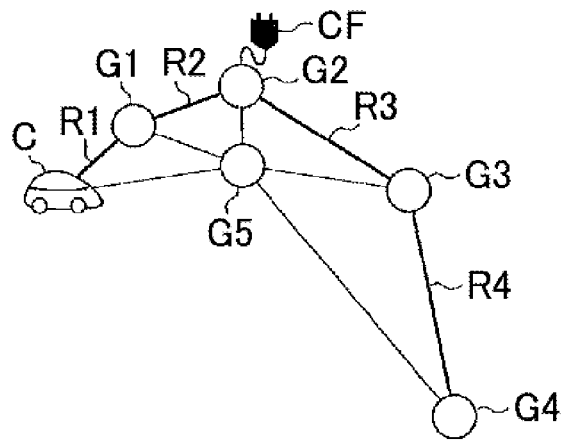
FIG. 4 schematically shows an example of a method of adding a destination.

Next, the procedure according to destination addition setting processing in the navigation device 10 is explained with reference to FIGS. 2 to 4. FIG. 2 is a flow chart showing the procedure according to the destination addition setting processing. FIG. 3 is a flow chart showing the procedure of route information calculation processing in the destination addition setting processing. In addition, FIG. 4 schematically shows an example of a method of adding a destination.

The destination addition setting processing in the navigation device 10 can be realized by hardware including various kinds of circuits, as well as by software having a route display program as a main program, which is read from the ROM 33 or the geographical information storage part 23. Hereinafter, an example is explained, in which the destination addition setting processing in the navigation device 10 can be realized by the software.

The controller 11 judges to start the destination addition setting processing when an ignition switch is turned on. Thereafter, the controller 11 waits until an adding command for a destination is input on the display 14, that is, a setting command for a plurality of destinations is input on the display 14 (Step S10).

When the setting command for the plurality of destinations is input on the display 14 (Step S10: YES), the controller 11 searches for adding positions of an added destination, that is, the stopping order combinations of the plurality of destinations such that the routes in which the plurality of destinations are stopped by in different stopping orders are structured (Step S20). In the present embodiment, the controller 11 searches for, as the adding positions of the newly added destination, a position before (on the side of the departure point from) a destination in the previously-set route and a position after (on the side of the final destination from) a destination in the previously-set route. For example, as shown in FIG. 4, the current position of the vehicle C is set as the departure point and a route is set with a route element R1, a route element R2, a route element R3, and a route element R4, which connect the following sections of (a) to (d).

(a) Between the vehicle C and a destination G1 (C-G1): Route element R1
(b) Between the destination G1 and a destination G2 (G1-G2): Route element R2
(c) Between the destination G2 and a destination G3 (G2-G3): Route element R3
(d) Between the destination G3 and a destination G4 (G3-G4): Route element R4

When a new destination G5 is added to the previously-set route, the controller 11 searches for, as the adding positions of the destination G5, the five positions of the above (a) C-G1, the above (b) G1-G2, the above (c) G2-G3, the above (d) G3-G4, and (e) after the destination G4 (after G4).

In a route in which the stops are made at a plurality of destinations, there is a case in which a visit purpose of one destination is closely related to a visit purpose of another destination in the stopping order. For example, if the above destination G4 is a home of a user's friend and the above destination G3 is a department store where the user is going to buy a gift for the friend, the stopping order of the destination G4 has to be after the destination G3. The relative stopping order of the destinations having such mutual relation is preferably maintained in order so that routes meeting the user's intention are determined.

In case of the above configuration in which the new destination G5 is added to the previously-set route, routes are searched such that the new destination G5 is stopped by before and after each of the destinations G1 to G4 included in the previously-set route. Therefore, new routes are searched in a condition in which the relative stopping order of the previously-set destinations G1 to G4 is maintained. Consequently, if the destinations are closely related each other in the stopping order as mentioned above, it is possible to search for routes that further meet the user's intention.

When positions of the new destination are searched, routes are searched for the respective positions of the new destination. The controller 11 calculates the travel distance D, the travel time Ts, and the road fee Cr for all searched routes. That is, the routine of the route information calculation processing shown in FIG. 3 is executed (Step S30).

In the routine of the route information calculation processing, as shown in FIG. 3, a route if the new destination is added is searched for each of the adding positions of the new destination searched at S20, as well as the number of the searched routes (a route number) N is temporarily stored in the RAM 32 (Step S31). Subsequently, a numerical value indicating the number of calculations n of the route information is counted up by one (Step S32). Note that an initial numerical value of the number of calculations n of the route information is zero. For example, if five routes are searched, the route number (N=5) is temporarily stored and calculation processing is executed five times in order to sequentially calculate the route information for the respective five routes (n=1, 2, 3, 4, 5). In calculating the route information, all the destinations are initially treated as the destinations not including a charging facility. The route information for one searched route, of which route information is not yet calculated among the plurality of searched routes, is calculated by respectively adding the travel distances D, the required times T, and the travel fees Cf of the route elements forming the one searched route (Step S33).

Next, the controller 11 acquires the current (at the time of departure) remaining amount Er (Er0) of the battery at the current position (at the departure point) from the battery control part 13 (Step S34). When the remaining amount Er0 at the current position is acquired, the controller 11 calculates a route position on the searched route which can be reached with the remaining amount Er0, that is, the travelable position in the one searched route is calculated (Step S35). Then, the controller 11 determines whether the travelable position in the one searched route is after the final destination (that is, in the direction opposite to the departure point) (Step S36).

If it is determined that the travelable position is after the final destination (Step S36: YES), the route information calculation processing for the one searched route is terminated and the controller 11 treats the above-mentioned route information as the route information of the one searched route. Subsequently, the controller 11 determines whether the calculation processing of the route information has been completed for all the searched routes, that is, whether the number of calculations n is equal to the route number N (Step S37).

If it is determined that the calculation processing of the route information is not completed for all the searched routes yet (n<N) (Step S37: NO), the procedure returns to Step S32, and Step S32 and the subsequent processing is executed. On the other hand, if it is determined that the calculation processing of the route information has been completed for all the searched routes (Step S37: YES), the respective numerical values of the route number N that was temporarily stored in the RAM 32 and the number of calculations n that was counted up are cleared (Step S38). Thereafter, the routine of the route information calculation processing is terminated.

On the other hand, if it is determined at Step S36 that the travelable position is not after the final destination (Step S36: NO), the controller 11 determines whether a destination including a charging facility exists before (on the current position (the departure point) side of) the travelable position (Step S39).

If it is determined that a destination including a charging facility does not exist before (on the current position (the departure point) side of) the travelable position (Step S39: YES), the controller 11 determines that the final destination cannot be reached on the searched route, that is, the searched route is an unreachable route. Thereafter, the controller 11 updates the route information of the searched route such that the information indicating that the searched route is an unreachable route is added to the route information of the searched route (Step S40). Thereafter, the controller 11 transits to the above-mentioned processing of Step S37.

On the other hand, if it is determined that a destination including a charging facility exists before (on the current position side of) the travelable position (Step S39: NO), the controller 11 calculates the charging time Tv required for charging at the destination including the charging facility based on the remaining amount Er when the vehicle arrives at the destination including the charging facility and the designated charging amount Ers (Step S41). Thereafter, the controller 11 calculates the required time T for traveling the searched route by adding the travel time Ts of the searched route to the charging time Tv. In addition, at Step S41, the controller 11 also calculates the charging fee Cv required at the destination including the charging facility based on the remaining amount Er when the vehicle arrives at the destination including the charging facility and the designated charging amount Ers. Thereafter, the controller 11 calculates the travel fee Cf required to travel the searched route by adding the road fee Cr of the searched route to the charging fee Cv.

When the charging time Tv, the required time T, the charging fee Cv, and the travel fee Cf are calculated, the controller 11 calculates the route position which can be reached from the destination including the charging facility with the designated charging amount Ers, that is, the travelable position (Step S42). Subsequently, the controller 11 determines whether the travelable position is after the final destination (Step S43). If it is determined that the travelable position is after the final destination (Step S43: YES), the controller 11 determines that the searched route is the route on which the final destination can be reached by charging, that is, the searched route is a charging-required route. Then, the controller 11 updates the route information of the searched route such that the information indicating that the searched route is the charging-required route is added to the route information in a charging processing completed status (Step S44). When the processing at Step S44 is terminated, the controller 11 transits to the above-mentioned processing of Step S37. On the other hand, when it is determined that the travelable position is not after the final destination (Step S43: NO), the controller 11 determines that the searched route is the route on which the final destination cannot be reached even when charging is executed at the destination including the charging facility, that is, the searched route is an unreachable route. Then, the controller 11 updates the route information of the searched route such that the information indicating that the searched route is the unreachable route is added to the route information in the charging processing completed status (Step S45). When the processing at Step S45 is terminated, the controller 11 transits to the above-mentioned processing of Step S37.

When the route information is calculated for all searched routes that are structured for the respective added positions, the destination addition setting screen, in which the route information, the necessity of charging, and the stopping order are associated for each searched route, is displayed on the display part 14a. Thereafter, the destination addition setting processing is terminated (Step S50).

Figure 5:
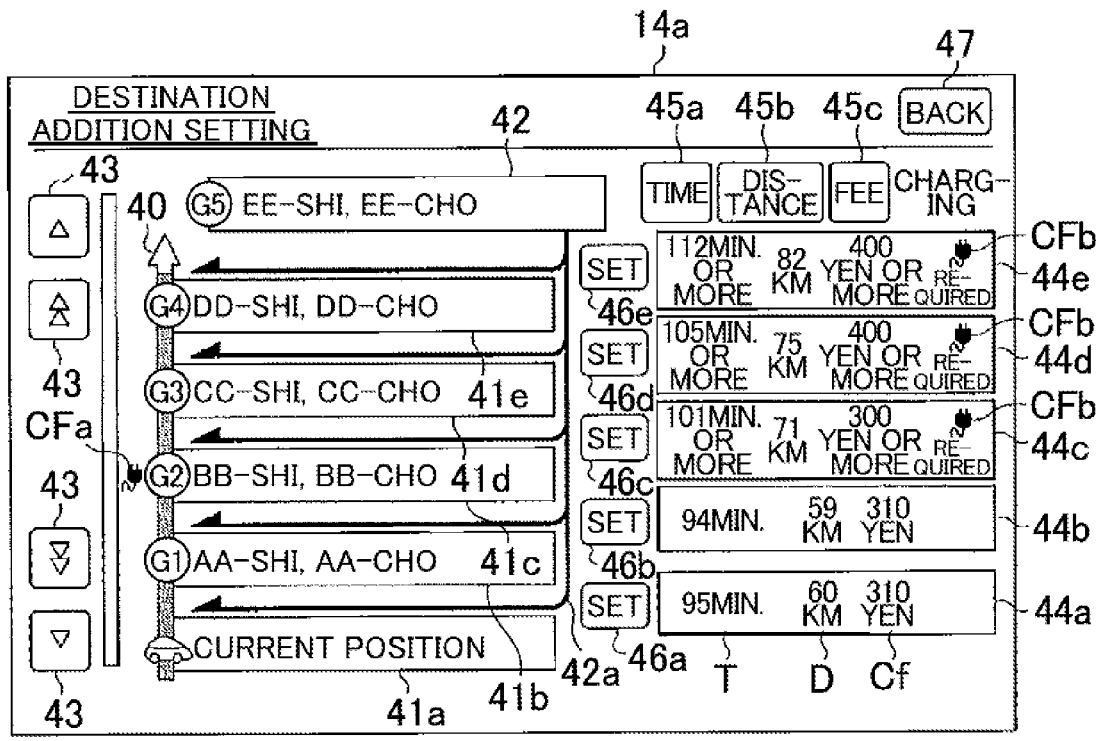
FIG. 5 shows an example of a destination addition setting screen displayed by the navigation device.

Next, an example of the destination addition setting screen output by the above-mentioned destination addition setting processing is explained with reference to FIG. 5. FIG. 5 shows an example of the destination addition setting screen displayed on the display part 14a of the navigation device 10. The destination addition setting screen shown in FIG. 5 is the display screen with a white background, and displays an example in which the new destination G5 is added to the route connecting the destinations G1 to G4, as shown in FIG. 4. Here, the destinations G1, G3, G4, and G5 are points not including a charging facility CF. The destination G2 is a point including the charging facility CF.

As shown in FIG. 5, in the destination addition setting screen shown in the display part 14a, the vehicle index serving as the index of the vehicle and destination indexes serving as the indexes of the respective destinations G1 to G4 are allocated on a route index 40 serving as the index of the route in the stopping order from the lower side to the upper side of the screen. On the right side of the vehicle index and the destination indexes in the screen, name sections 41a, 41b, 41c, 41d, and 41e, in which the names of the respective indexes are displayed, are provided. On the left side of the destination indexes in the screen, a charging facility index CFa indicating that the destination corresponding to the destination index includes the charging facility is displayed. When the charging facility index CFa is displayed, the user can recognize that only the destination G2 includes the charging facility among the destinations G1 to G4. In addition, when the charging facility index CFa is not displayed, the user can recognize that the destinations other than the destination G2 do not include the charging facility.

On the left side of the charging facility index CFa in the screen, various operation buttons 43 for scrolling or skipping on the display part 14a the respective destination indexes allocated on the route index 40 are displayed. When the operation button 43 in which an up-pointing arrow is drawn is pressed, the destination indexes and the name sections are scrolled or skipped upward the screen in the following order: the destinations G4, G3, G2, and G1. On the other hand, when the operation button 43 in which a down-pointing arrow is drawn is pressed, the destination indexes and the name sections are scrolled or skipped downward the screen in the following order: the destinations G1, G2, G3, and G4. Such operation buttons 43 are used to rearrange the order of the destination indexes displayed on the route index 40, that is, to change the stopping order of the destinations, or to delete the destination index displayed on the route index 40, that is, to cancel the destination setting.

On the upper side of the route index 40 in the screen, an adding destination index serving as the index of the newly-adding destination G5 is displayed. On the right side of the adding destination index in the screen, a name section 42, in which the name of the newly-adding destination is displayed, is provided. The destination index displayed on the route index 40 is added each time the name of a newly-adding destination is input in the name section 42. By means of thick arrows extending from the name section 42 of the destination G5, with which the adding positions of the destination G5 are indicated, the following five searched route indexes serving as the indexes of the searched routes are displayed.

The index of a first searched route having the adding position in the above (a) C-G1: First searched route index The index of a second searched route having the adding position in the above (b) G1-G2: Second searched route index The index of a third searched route having the adding position in the above (c) G2-G3: Third searched route index The index of a fourth searched route having the adding position in the above (d) G3-G4: Fourth searched route index The index of a fifth searched route having the adding position in the above (e) after G4: Fifth searched route index On the right side of the above first to fifth searched route indexes in the screen, setting buttons 46a, 46b, 46c, 46d, and 46e for setting the searched routes corresponding the first to fifth searched route indexes as guidance routes are displayed. When any of the setting buttons 46a to 46e is pressed, the searched route corresponding to the setting button is set as the guidance route.

On the right side of the setting buttons 46a to 46e in the screen, route information display sections 44a, 44b, 44c, 44d, and 44e, in which the route information of the corresponding searched routes is displayed, are provided. In the route information display sections 44a to 44e, the required time T, the travel distance D, the travel fee Cf, and a charging index CFb indicating that further charging is required are displayed as the route information. When the charging index CFb is displayed, it is indicated that further charging at a destination other than the set destinations is required. On the other hand, when the charging index CFb is not displayed, it is indicated that further charging at a destination other than the set destinations is not required.

According to the destination addition setting screen having such configuration, the necessity of charging is associated with the stopping order for each of the plurality of searched routes having different stopping order combinations of the destinations, and displayed. Therefore, it is possible to make the user recognize the necessity of charging, that is, whether all the destinations can be reached with the limited remaining amount Er of the battery for each of the plurality of searched routes having different stopping order combinations of the selected destinations. In addition, for the route in which the charging is required, it is possible to encourage the user in setting the destinations to take a measure such as newly-adding a charging facility as a destination, moving a destination including a charging facility that is already set as a stop destination closer to the final destination, and selecting a stopping order in which the charging is not required. Further, besides the necessity of charging, the required time T, the travel distance D, and the travel fee Cf are associated with the stopping order for each route, and displayed. That is, most of the travel information given from the searched route is associated with the searched route, and displayed together with the travel information of other searched routes on a list. Therefore, according to such destination addition setting screen, it becomes easy for the user not only to recognize the travel information for each searched route, but also to compare the travel information between the searched routes.

For example, in the route information display section 44a corresponding to the first searched route index, "95 min., 60 km, 310 yen (blank)" is displayed as the route information of the first searched route calculated in the destination addition setting processing. In addition, in the route information display section 44b corresponding to the second searched route index, "94 min., 59 km, 310 yen (blank)" is displayed as the route information of the second searched route calculated in the destination addition setting processing.

The first searched route and the second searched route corresponding to the route information display sections 44a and 44b are the routes that were determined as the charging-required routes in the above-mentioned destination addition setting processing. The charging index CFb indicating that the charging is required is not displayed in either the route information display sections 44a or 44b. That is, it becomes easy to make the user recognize that, in these two routes having different stopping order combinations of the destinations G1 to G5, the charging at another charging facility than the destination G2 is not required, that is, all the destinations can be reached by the charging at the destination G2.

If a charging facility is set as a destination, the battery is normally charged up to the designated charging amount Ers at the charging facility. If an increase of the remaining amount Er by the charging is not reflected into the necessity of charging although the charging is performed at the charging facility, the accuracy of the information regarding the necessity of charging is lowered. In this regard, according to the above-mentioned destination addition setting processing, the charging facility is set as the destination G2 located within the travel area and it is predicted that the remaining amount Er at the charging facility is the designated charging amount Ers. For the route after the destination G2, the necessity of charging is predicted based on the travelable position which can be reached with the designated charging amount Ers. That is, the charging amount at the charging facility is considered; therefore, it is possible to increase the accuracy of the information regarding the necessity of charging.

In addition, the criteria of the user in selecting a searched route from the plurality of searched routes include the required time T for traveling the searched route. In this regard, according to the above-mentioned configuration, the required time T for traveling the searched route includes the charging time Tv at the charging facility. Therefore, if the charging facility is included in the destinations G1 to G5, it is possible to provide the user with the information on the required time T including the charging time Tv at the charging facility. Therefore, it is possible to make the user recognize for example that the second searched route should be selected if the guidance route is selected with priority on the required time T.

In addition, the criteria of the user in selecting a searched route from the plurality of searched routes also includes the travel fee Cf required to travel the searched route. In this regard, according to the above-mentioned configuration, if a charging facility is set as a destination within the travel area, the travel fee Cf required to travel the route includes the charging fee Cv at the charging facility. Therefore, if the charging facility is included in the destinations G1 to G5, it is possible to previously provide the user with the information on the travel fee Cf in which the charging fee Cv at the charging facility is reflected. Therefore, it is possible to make the user recognize, for example, that the second searched route should be selected if the guidance route is selected with priority on the travel fee Cf.

On the other hand, in the route information display section 44c corresponding to the third searched route, "101 min. "or more", 71 km, 300 yen "or more" (required)" is displayed as the route information of the third searched route calculated in the destination addition setting processing. In addition, in the route information display section 44d corresponding to the fourth searched route, "105 min. "or more", 75 km, 400 yen "or more" (required)" is displayed as the route information of the fourth searched route calculated in the destination addition setting processing. Further, in the route information display section 44e corresponding to the fifth searched route, "112 min. "or more", 82 km, 400 yen "or more" (required)" is displayed as the route information of the fifth searched route calculated in the destination addition setting processing.

In these three route information display sections 44c to 44e, the contents are displayed in red. On the other hand, in the above-mentioned two route information display sections 44a and 44b, the contents are displayed in black. Therefore, the contents displayed in the route information display sections 44c to 44e are visually enhanced compared to the other route information display sections 44a and 44b. In addition, the third searched route, the fourth searched route, and the fifth searched route corresponding to the route information display sections 44c to 44e are the routes that were determined as the unreachable routes in the above-mentioned destination addition setting processing. Further, the charging index CFb indicating that the charging is required is displayed in all of the route information display sections 44c to 44e. That is, it is possible to make the user clearly recognize that, in the three routes having different stopping order combinations of the destinations G1 to G5, the charging is required at another charging facility than the destination G2, that is, all the destinations cannot be reached only by the charging at the destination G2 that is the destination including the charging facility. For the third searched route, the fourth searched route, and the fifth searched route, it is possible to encourage the user in setting the destinations to take a measure such as newly-adding a charging facility as a destination, moving the destination G2 including the charging facility that is already set as a stop-by destination closer to the final destination, and selecting a stopping order in which the charging is not required.

On the upper side of the required times T in the route information display sections 44a to 44e in the screen, a required time button 45a is displayed. On the upper side of the travel distances D in the route information display sections 44a to 44e in the screen, a travel distance button 45b is displayed. On the upper side of the travel fees Cf in the route information display sections 44a to 44e in the screen, a travel fee button 45c is displayed. The required time button 45a outputs a display command for displaying the details of the required time T for each searched route to the controller 11. The travel distance button 45b outputs a display command for displaying the details of the travel distance D for each searched route to the controller 11. The travel fee button 45c outputs a display command for displaying the details of the travel fee Cf for each searched route to the controller 11.

When the required time button 45a is pressed, the screen changes to the destination addition setting screen, in which the details of the required time T for each searched route are displayed. When the travel distance button 45b is pressed, the screen changes to the destination addition setting screen, in which the details of the travel distance D for each searched route are displayed. When the travel fee button 45c is pressed, the screen changes to the destination addition setting screen, in which the details of the travel fee Cf for each searched route are displayed.

Figure 8:
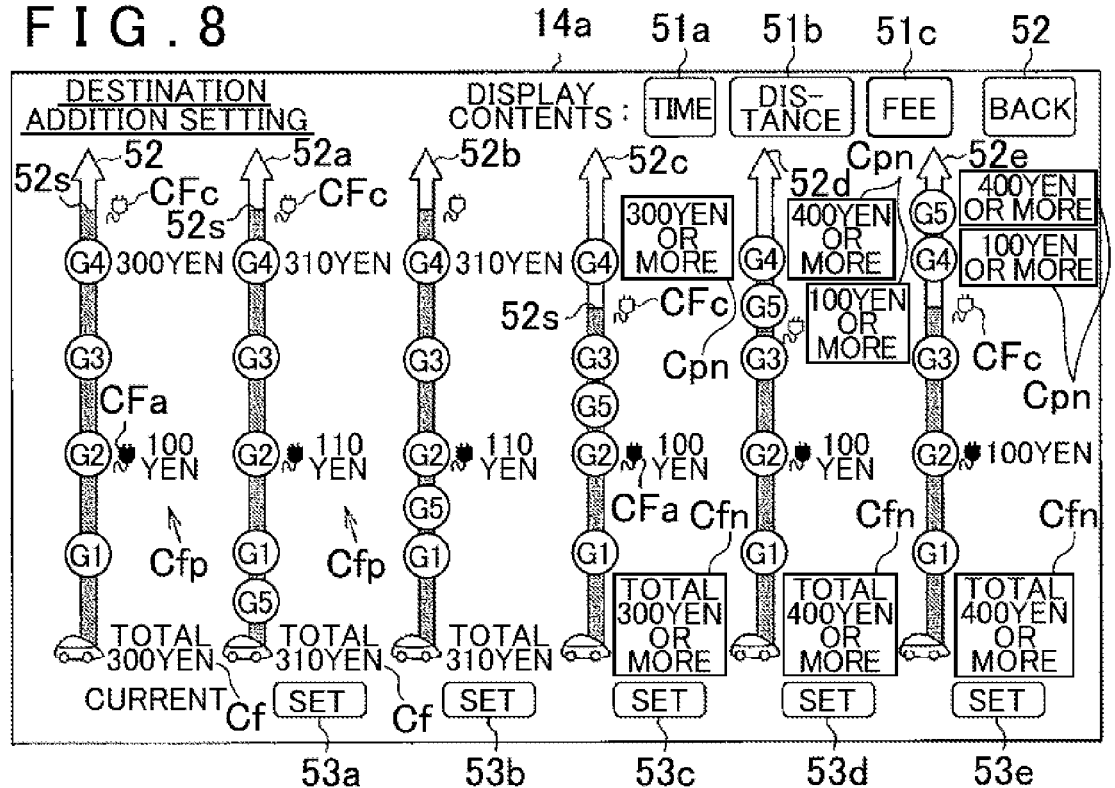
FIG. 8 shows an example of the destination addition setting screen displayed by the navigation device.

Next, an example of the destination addition setting screen, in which the details of the required time T, the travel distance D, and the travel fee Cf are displayed, is explained with reference to FIGS. 6 to 8. FIGS. 6 to 8 are the destination addition setting screen, in which the details of the required time T are displayed, the destination addition setting screen, in which the details of the travel distance D are displayed, and the destination addition setting screen, in which the details of the travel fee Cf are displayed, respectively. FIGS. 6 to 8 show examples when the new destination G5 is added to the route connecting the destinations G1 to G5, similar to FIG. 5. The destination addition setting screens, in which the details of the travel distance D and the travel fee Cf are displayed, have a display parameter different from the destination addition setting screen, in which the details of the required time T are displayed; however, the other main configurations are the same. Therefore, such different points are specially explained below.

As shown in FIG. 6, in the destination addition setting screen shown in the display part 14a, the vehicle index serving as the index of the vehicle and the destination indexes serving as the indexes of the destinations G1 to G4 are allocated on the route index serving as the index of each route in the stopping order from the lower side to the upper side of the screen. An initial route index 52 serves as the index of the previously-set route. In the destination addition setting screen, besides the initial route index 52, the following five route indexes (a) to (e) corresponding to the respective routes are displayed.

The index of the searched route having the adding position in the above (a) C-G1: First searched route index 52a The index of the searched route having the adding position in the above (b) G1-G2: Second searched route index 52b The index of the searched route having the adding position in the above (c) G2-G3: Third searched route index 52c The index of the searched route having the adding position in the above (d) G3-G4: Fourth searched route index 52d The index of the searched route having the adding position in the above (e) after G4: Fifth searched route index 52e A travelable position index 52s serving as the index of the travelable position is displayed in each of the searched route indexes 52a to 52e, such that a relative positional relation among the destinations G1 to G4 and the travelable position is maintained in the destination addition setting screen, which clearly indicates the relative positional relation between the respective destination indexes and the travelable position index 52s.

For example, in the first searched route index 52a, the travelable position index 52s is displayed on the upper side of the destination index of the destination G4 in the screen, and the area from the vehicle index to the travelable position index 52s is displayed in blue. Therefore, it is possible to make the user recognize because of the difference in the displayed color that the vehicle can travel from the current position to after the destination G4 if the first searched route is selected as the guidance route. In addition, in the second searched route index 52b, the travelable position index 52s is displayed on the upper side of the destination index of the destination G4 in the screen, similar to the first searched route index 52a. Therefore, it is possible to make the user recognize because of the difference in the displayed color that the vehicle can travel from the current position to after the destination G4.

On the other hand, in the third searched route index 52c, the travelable position index 52s is displayed on the lower side of the destination index of the destination G4 in the screen, and the area from the vehicle index to the travelable position index 52s is displayed in blue. Therefore, it is possible to make the user recognize because of the difference in the displayed color that the charging is required at another charging facility than the destination G2, that is, the destination G4 cannot be reached only by the charging at the destination G2 if the third searched route is selected as the guidance route. Also, in the fourth searched route index 52d and the fifth searched route index 52e, the travelable position index 52s is displayed on the lower side of the destination index of the destination G4 in the screen, similar to the third searched route index 52c. Therefore, it is possible to make the user recognize because of the difference in the displayed color that the destination G4 cannot be reached only by the charging at the destination G2.

The first searched route index 52a to the fifth searched route index 52e are arranged from the left to the right of the screen. And also, the displayed positions of the destination indexes in the respective searched route indexes are aligned in the vertical direction of the screen. Therefore, it becomes easy for the user to compare the travelable position indexes 52s between the searched routes. Further, it becomes possible to make the user easily recognize how the travelable position index 52s changes when the adding position of the destination G5 is changed, or which is the farthest destination the vehicle can reach. Consequently, for the route in which the charging is further required, it is possible to more appropriately encourage the user to take a measure such as newly-adding a charging facility as a destination, and moving a charging facility closer to the final destination.

On the right side of each searched route index in the screen, more specifically, on the right side of the destination index of the destination G2 and the right side of the travelable position index 52s in the screen, the charging facility index CFa and a charging-required index CFc are displayed respectively. The charging facility index CFa serves as the index of whether the destination includes the charging facility, similar to the above-mentioned destination addition setting screen, and represents that the charging is performed at the charging facility. In addition, the charging-required index CFc serves as the index of the position where the charging becomes necessary, and represents that no charging facility exists at the position. When the charging facility index CFa and the charging-required index Cfc are displayed, it becomes easy to compare between the searched routes regarding at which point on the respective searched routes the charging is performed, or at which point the charging should be performed.

On the farther right side of each searched route index in the screen, the required time for arriving at the reachable destination is displayed next to the index of the corresponding destination in black as an arrival time Tp, and the required time for arriving at the unreachable destination is displayed next to the index of the corresponding destination in red as a lower limit arrival time Tpn. In addition, on the right side of the vehicle index in the screen, the required time T of the reachable route is displayed next to the index of the corresponding searched route, and a lower limit required time Tn of the unreachable route is displayed next to the index of the corresponding searched route. Further, on the right side of the charging facility index CFa in the screen, a time for arriving at the destination G2 and a time of departure from the destination G2, that is, the charging time Tv is displayed.

According to the destination addition setting screen having such configuration, the details of the required time given from the searched route such as the required time for traveling to each destination is associated with the corresponding searched route, and displayed together with those of the other searched routes on a list. Therefore, it becomes easy for the user not only to recognize the details of the required time for each searched route, but also to compare the details of the required times between the searched routes.

For example, in the first searched route index 52a, "Total 95 min." is displayed as the required time T, and also "23 min. 58 min." is displayed on the right side of the destination G2 in the screen. Therefore, it is possible to make the user easily recognize that it takes 95 minutes to arrive at the destination G4 as the final destination and the charging at the destination G2 takes 35 minutes if the first searched route is selected as the guidance route.

On the other hand, in the third searched route index 52*c*, "Total 101 min. "or more"" is displayed as the lower limit required time Tn, and "17 min. 52 min." is displayed on the right side of the destination G2 in the screen. Therefore, it is possible to make the user easily recognize that it takes at least 101 minutes to arrive at the destination G4 as the final destination and the charging at the destination G2 also takes 35 minutes if the third searched route is selected as the guidance route. In the fourth searched route index 52*d*, "Total 105 min. "or more"" is displayed as the lower limit required time Tn, and "17 min. 52 min." is displayed on the right side of the destination G2 in the screen. Further, on the right side of the index of the destination G4 and the index of the destination G5 in the screen, "77 min. "or more"" and "105 min. "or more"" are displayed as the lower limit arrival time Tpn. Therefore, it is possible to make the user easily recognize because of the difference in the displayed color that it takes at least 105 minutes to arrive at the destination G4 as the final destination and the charging at the destination G2 also takes 35 minutes if the fourth searched route is selected as the guidance route.

On the upper side of the first to fifth searched route indexes 52*a* to 52*e* in the screen, a required time button 51*a*, a travel distance button 51*b*, and a travel fee button 51*c* are displayed. The required time button 51*a* serves as the index indicating the current displayed contents, and is displayed at a higher luminance level than the other buttons 51*b* and 51*c* in order to indicate that the displayed contents are the details of the required time T. The travel distance button 51*b* outputs a display command for displaying the details of the travel distance D for each searched route to the controller 11. The travel fee button 51*c* outputs a display command for displaying the details of the travel fee Cf for each searched route to the controller 11.

On the lower side of the first to fifth searched route index 52*a* to 52*e*, setting buttons 53*a*, 53*b*, 53*c*, 53*d*, and 53*e* for setting the searched routes corresponding to the first to fifth searched route indexes as the guidance routes are displayed. When any of the setting buttons 53*a* to 53*e* is pressed, the searched route corresponding to the setting button is set as the guidance route.

In the above display status, if the travel distance button 51*b* is pressed, the screen changes to the destination addition setting screen, in which the details of the travel distance D is displayed. As shown in FIG. 7, the destination addition setting screen, in which the details of the travel distance D is displayed, has a display parameter different from the destination addition setting screen of FIG. 6, in which the details of the required time T are displayed; however, the other main configurations are the same. On the right side of each of the searched route indexes 52*a* to 52*e* in the screen, the travel distance for arriving at the reachable destination is displayed next to the index of the corresponding destination in black as an arrival distance Dp, and the travel distance for arriving at the unreachable destination is displayed next to the index of the corresponding destination in red as a lower limit arrival distance Dpn. In addition, on the right side of the vehicle index in the screen, the travel distance D of the reachable route is displayed next to the index of the corresponding searched route in black, and a lower limit travel distance Dn of the unreachable route is displayed next to the index of the corresponding searched route in red.

According to the destination addition setting screen having such configuration, the details of the travel distance given from the searched route such as the travel distance required to travel to each destination is associated with the corresponding searched route, and displayed together with those of the other searched routes. Therefore, it becomes easy for the user not only to recognize the details of the travel distance for each searched route, but also to compare the details of the travel distances between the searched routes.

In the above display status, if the travel fee button 51*c* is pressed, the screen changes to the destination addition setting screen, in which the details of the travel fee Cf is displayed. As shown in FIG. 8, the destination addition setting screen, in which the details of the travel fee is displayed, has a display parameter different from the destination addition setting screens of FIGS. 6 and 7, in which the details of the required time T and the travel distance D are displayed; however, the other main configurations are the same. On the right side of each of the searched route indexes 52*a* to 52*e* in the screen, the travel fee including the charging fee for arriving at the reachable destination is displayed next to the index of the corresponding destination in black as an destination fee Cfp, and the travel fee including the charging fee for arriving at the unreachable destination is displayed next to the index of the corresponding destination in red as a lower limit destination fee Cpn. In addition, on the right side of the vehicle index in the screen, the travel fee Cf of the reachable route is displayed next to the index of the corresponding searched route in black, and a lower limit travel fee Cfn of the unreachable route is displayed next to the index of the corresponding searched route in red.

According to the destination addition setting screen having such configuration, the details of the travel fee given from the searched route such as the travel fee required to travel to each destination is associated with the corresponding searched route, and displayed together with those of the other searched routes. Therefore, it becomes easy for the user not only to recognize the details of the travel fee for each searched route, but also to compare the details of the travel fees between the searched routes.

As described above, according to the above-mentioned route display device, the route display method, and the route display program, the following effects can be obtained.

(1) The charging index CFb is associated with the stopping order for each of the plurality of searched routes having different stopping order combinations of the destinations, and displayed. Therefore, it is possible to make the user recognize the necessity of charging, that is, whether all the destinations can be reached with the limited remaining amount of the battery for each of the plurality of searched routes having different stopping order combinations of the destinations.

(2) The destination indexes displayed in the stopping order and the travelable position index 52*s* are displayed on the searched route index for each of the plurality of searched routes having different stopping order combinations of the destinations. Therefore, it is possible to make the user recognize the necessity of charging, that is, whether all the destinations can be reached with the limited remaining amount Er of the battery for each of the plurality of searched routes having different stopping order combinations of the destinations.

(3) In addition, for the searched route in which the charging is further required, it is possible to encourage the user in setting the destinations to take a measure such as newly-adding a charging facility as a destination, moving a destination including a charging facility that is already set as a stop-by destination closer to the final destination, and selecting a stopping order in which the charging is not required.

(4) If a charging facility is set as a destination within the travel area, it is predicted that the remaining amount Er at the charging facility is the designated charging amount Ers. For the route after the charging facility, the necessity of charging is predicted based on the travelable position which can be reached with the designated charging amount Ers. Therefore, if the charging facility is included in the plurality of destinations, the accuracy of the information regarding the necessity of charging can be increased.

(5) A plurality of destination indexes and the travelable position index are allocated in a travel order (the stopping order) and displayed for each searched route index; therefore, it is possible to make the user recognize at which point on the route stopping by the plurality of the destinations the charging becomes necessary, that is, which is the farthest destination the vehicle can reach with the limited remaining amount Er of the battery. In addition, the above-mentioned information is displayed for each searched route; therefore, it is possible to make the user roughly recognize which destination(s) can be reached in which stopping order.

(6) If a charging facility is set as a destination within the travel area, the required time T for traveling the searched route includes the charging time Tv at the charging facility. Therefore, if the charging facility is included in the plurality of destinations, the required time T including the charging time Tv at the charging facility is informed to the user.

(7) If a charging facility is set as a destination within the travel area, the travel fee Cf required to travel the searched route includes the charging fee Cv at the charging facility. Therefore, if the charging facility is included in the plurality of destinations, it is possible to previously inform the user of the travel fee Cf in which the charging fee Cv at the charging facility is reflected.

(8) If a new destination is added to the previously-set searched route, new routes are searched such that the new destination is stopped by before and after a destination included in the previously-set searched route. Therefore, a plurality of searched routes are newly searched in such manner that a relative stopping order of the destinations in the previously-set searched route is maintained. Therefore, if the destinations are closely related each other in the stopping order, it is possible to provide information on routes that meet the user's intention.

In addition, the above embodiment can be modified and realized as appropriate as indicated below.

In the above-mentioned route information calculation processing, if it is determined based on the remaining amount Er0 of the battery at the current position such as the departure point that the travelable position is after the final destination (Step S36: YES), the route information, which was calculated under the assumption that no charging facility exists on the searched route, is treated as the route information on the searched route. However, when a charging facility is set as a destination, even if it is determined based on the remaining amount Er0 at the current position that the travelable position is after the final destination, the after-mentioned calculated result (a), (b), and (c) may be used as the route information.

(a) The required time calculated by adding the charging time required for the charging at the charging facility to the travel time of the searched route.

(b) The travel fee calculated by adding the charging fee required for the charging at the charging facility based on the remaining amount of the battery at the time of arrival at the charging facility to the road fee required to travel the searched route.

(c) The travelable position which can be reached from the charging facility with the designated charging amount Ers.

In addition, based on the remaining amount Er0 of the battery at the current position such as the departure point, the route (hereinafter referred to as "charging-not-required route") for which it has been determined that the travelable position is after the final destination (Step S36: YES) and the route for which it has been determined as a charging-required route (Step S43: YES) may be displayed so as to be visually recognized on the destination addition setting screen shown in FIGS. 5 to 8.

If a destination including a charging facility is set as a destination to be stopped-by, it is normally supposed that charging is performed at the destination. However, some drivers only intend to stay at the destination for a short period of time. For such drivers, it is preferable in selecting a route that the charging-not-required route that is a route in which the final destination can be reached without charging at the destination including the charging facility and the charging-required route that is a route in which the final destination can be reached by charging at the destination including the charging facility are displayed in a visually-recognized manner.

Further, in such a case, the charging-required route and the unreachable route may be displayed in a visually-not-recognized manner. In other words, only whether the route is the charging-not-required route may be displayed in a visually-recognized manner. That is, the updated contents at Step S40, Step S44, and Step S45 in the flow chart of FIG. 3 may not be displayed.

For example, when the driver plans to perform charging at the final destination, if a destination to be stopped by includes a charging facility, the driver may not perform charging at such destination. For such driver, in selecting a route, it is sufficient that whether the route is the charging-not-required route that is a route in which the final destination can be reached only with the remaining amount of the battery at the current position serving as the departure point is displayed in a visually-recognized manner.

Figure 9:
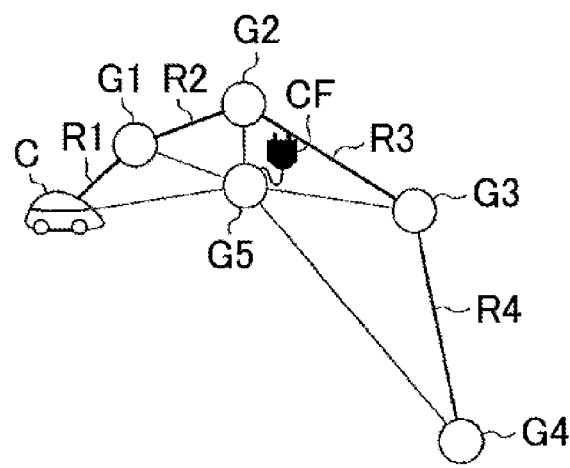
FIG. 9 schematically shows another example of a method of adding a destination.
Figure 10:
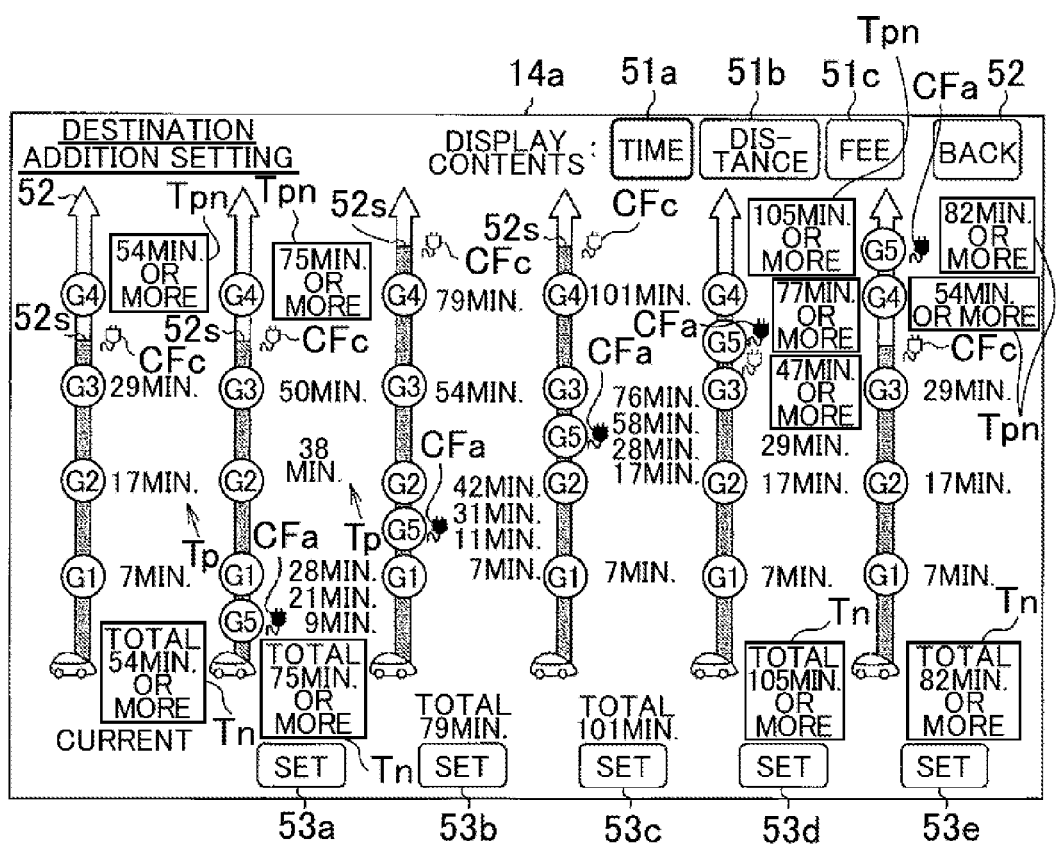
FIG. 10 shows an example of the destination addition setting screen displayed by the navigation device.

In the above embodiment, the destination G5 not including the charging facility is newly added. However, the destination G5 including the charging facility may be newly added. For example, as shown in FIG. 9, the destination G5 including the charging facility may be newly added to the route connecting the destinations G1 to G4, any of which does not include the charging facility. In such a case, as shown in FIG. 10, in the destination addition setting screen, the charging facility index CFa is displayed on the right side of the destination index of the newly-added destination G5 in the screen.

In such destination addition setting screen, the relative position between the travelable position index 52s and the charging facility index CFa is displayed for each searched route on a list. Therefore, it is easy to make the user recognize at which point on the route connecting the destinations G1 to G4 the charging should be performed. In addition, as shown in FIG. 10, if the respective searched route indexes are displayed such that the charging facility index CFa sequentially shifts in a travel direction of the routes, a change in the travel information according to a charging point can be more easily recognized compared to if the charging facility index CFa is disorderly displayed on the screen.

The number of charging facilities included in the searched route may be two or more. If the travel information is calculated for the searched route including two or more charging facilities, the calculation of the charging time and the charging fee (Step S41), the calculation of the travelable position which can be reached with the designated charging amount (Step S42), and the determination regarding whether the travelable position is after the final destination (Step S43) are preferably executed for each charging facility.

A configuration, in which a new destination is added before (on the departure point side of) a destination in a previously-set searched route and after (on the final destination side of) the destination in the previously-set searched route, is exemplified. However, the stopping order of the destinations included in the previously-set searched route may be changed and the new destination may be added to each searched route after the change. Or, new searched routes may be structured in the stopping order combinations possible for all the destinations including the destinations included in the previously-set searched route as long as the plurality of routes are searched such that the stopping-orders of the plurality of destinations are different each other.

The destination addition setting screen is only necessary to be a screen, in which the necessity of charging is associated with the stopping order for each route. For example, the required time T, the travel distance D, and the travel fee Cf may not be displayed. In such configuration, it is possible to decrease information amount to be displayed in one screen. Thereby, it is possible to increase visibility of the information relating to the necessity of charging and suppress the load on the controller 11 for the display processing.

In the destination addition setting screen, a plurality of destination indexes and the travelable position index 52s are allocated in the travel order on the searched route index and displayed. However, the plurality of destination indexes and the travelable position index 52s may be displayed on different searched route indexes.

If a charging facility is set as a destination within the travelable area, it is predicted that the remaining amount Er of the battery at the destination is the designated charging amount Ers and the travelable position on the route that can be reached from the charging facility with the designated charging amount Ers is predicted. However, even if a charging facility is set as a destination within the travelable area, the point that can be reached with the remaining amount Er of the battery at the current position may be treated as the travelable position and various kinds of the travel information may be calculated based on such travelable position.

In the above embodiment, the controller 11 is configured to execute all the processing (the search unit, the prediction unit, and the display control unit). However, the present invention may be realized by a route display system that displays a route of the vehicle, where a plurality of devices (for example, a center device and a terminal device) capable of mutually transmitting and receiving the information execute the respective processing.

For example, the center device may execute the processing of the search unit and the prediction unit and send the results to the terminal device, and the terminal device that received the results may execute the processing of the display control unit. In addition, the route display system may include a plurality of devices other than the above two devices. For example, the route display system may include three devices such as the device to execute the processing of the search unit, the device to execute the processing of the prediction unit, and the device to execute the processing of the display control unit.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A route display device that displays a route of a vehicle, comprising:
a processor which is operable to configure:
a first search unit that searches for a route in which a plurality of destinations having mutual relation are stopped by in a relative stopping order;
a destination addition unit that adds a new destination to the route acquired by the first search unit;
a second search unit that searches for a plurality of routes in which the stopping orders are different from each other for the respective positions of the new destination;
a prediction unit that predicts, for each of the routes, a travelable position which can be reached with a remaining amount of a battery and predicts, for each of the routes, a necessity of charging based on whether the travelable position is on a side of a departure point in relation to a final destination; and
a display control unit that displays, for each of the routes, the necessity of charging in association with a corresponding stopping order for each of the routes, on a display part,
wherein the display control unit displays the plurality of routes acquired by the second search unit on the display part, the display control unit arranges and displays the plurality of destinations of the plurality of routes in the relative stopping order from the bottom to the top of the screen, and the display control unit displays travelable position indexes for the plurality of routes in a different color,
where each of the travelable position indexes indicates the farthermost position along the respective route that can be reached with the remaining amount of battery.

2. The route display device according to claim 1,
wherein, among the plurality of routes, for a route in which a charging facility is included in the destination within a travel area which can be reached with the remaining amount, the prediction unit is configured to:
predict that the remaining amount at the charging facility will be a designated charging amount that is the remaining amount after charging at the charging facility, and the travelable position on the route which can be reached from the charging facility with the designated charging amount; and
further predict the necessity of charging based on whether the travelable position is on the side of the departure point in relation to the final destination.

3. The route display device according to claim 1, wherein the display control unit arranges and displays the plurality of destinations and the travelable position in a travel order for each of the routes.

4. The route display device according to claim 1,
wherein the prediction unit is configured to:
for each of the plurality of routes, calculate a travel time for traveling the route as a required time of the route; and
among the plurality of routes, for a route in which a charging facility is included in the destination within a travel area which can be reached with the remaining amount, calculate the required time of the route by adding a charging time at the charging facility to the travel time of the route, and
wherein the display control unit displays the required time for each of the routes.

5. The route display device according to claim 1,
wherein the prediction unit is configured to:
for each of the plurality of routes, calculate a road fee required to travel the route as a travel fee of the route; and among the plurality of routes, for a route in which a charging facility is included in the destination within a travel area which can be reached with the remaining amount, calculate the travel fee of the route by adding a charging fee at the charging facility to the road fee of the route, and wherein the display control unit displays the travel fee for each of the routes.

6. A route display method for displaying a route of a vehicle, the method comprising:

searching, using a processor, for a route in which a plurality of destinations having mutual relation are stopped by in a relative stopping order;

adding a new destination to the route;

searching for a plurality of routes in which the stopping orders are different from each other for the respective positions of the new destination;

predicting, for each of the routes, a travelable position which can be reached with a remaining amount of a battery and predicting, for each of the routes, a necessity of charging based on whether the travelable position is on a side of a departure point in relation to a final destination; and displaying on a display, for each of the routes, the necessity of charging in association with a corresponding stopping order for each of the routes, wherein the plurality of routes are displayed on the display, the plurality of destinations of the plurality of routes are arranged and displayed in the relative stopping order from the bottom to the top of the screen, and travelable position indexes are displaced for the plurality of routes in a different color, where each of the travelable position indexes indicates the farthermost position along the respective route that can be reached with the remaining amount of battery.

7. A program recorded on a non-transitory medium comprising program code which, when run on a computer, causes the computer to execute the steps of method claim 6.

8. A route display system including a plurality of devices capable of mutually transmitting and receiving information that displays a route of a vehicle, the route display system comprising:

a processor which is operable to configure:

a first search unit that searches for a route in which a plurality of destinations having mutual relation are stopped by in a relative stopping order;

a destination addition unit that adds a new destination to the route acquired by the first search unit;

a second search unit that searches for a plurality of routes in which the stopping orders are different from each other for the respective positions of the new destination;

a prediction unit that predicts, for each of the routes, a travelable position which can be reached with a remaining amount of a battery and predicts, for each of the routes, a necessity of charging based on whether the travelable position is on a side of a departure point in relation to a final destination; and a display control unit that displays, for each of the routes, the necessity of charging in association with a corresponding stopping order for each of the routes on a display part, wherein the display control unit displays the plurality of routes acquired by the second search unit on the display part, the display control unit arranges and displays the plurality of destinations of the plurality of routes in the relative stopping order from the bottom to the top of the screen, and the display control unit displays travelable position indexes for the plurality of routes in a different color, where each of the travelable position indexes indicates the farthermost position along the respective route that can be reached with the remaining amount of battery.

9. The route display device according to claim 1, wherein the display control unit displays the plurality of routes such that a relative positional relation among the plurality of destinations of the plurality of routes and the travelable position is maintained.

10. The route display device according to claim 1, wherein the display control unit displays a travel distance for each of the plurality routes and displays a route on which the destination is reachable and a route on which the destination is not reachable in different display colors.

11. The route display device according to claim 1, wherein the display control unit displays a plurality of destinations over each of the plurality of routes.

* * * * *